US012098959B1

(12) United States Patent
Ai et al.

(10) Patent No.: US 12,098,959 B1
(45) Date of Patent: Sep. 24, 2024

(54) FOOD TEMPERATURE MEASUREMENT SYSTEM

(71) Applicant: Shenzhen Hongkang International Electronic Technology Co., Ltd., Shenzhen (CN)

(72) Inventors: Qilong Ai, Shenzhen (CN); Jieyuan Tan, Shenzhen (CN)

( * ) Notice: Subject to any disclaimer, the term of this patent is extended or adjusted under 35 U.S.C. 154(b) by 0 days.

(21) Appl. No.: 18/348,231

(22) Filed: Jul. 6, 2023

(30) Foreign Application Priority Data

May 24, 2023 (CN) .......................... 202321280428.7

(51) Int. Cl.
*G01K 1/024* (2021.01)
*H04W 4/38* (2018.01)
*H04W 4/80* (2018.01)

(52) U.S. Cl.
CPC .............. *G01K 1/024* (2013.01); *H04W 4/38* (2018.02); *H04W 4/80* (2018.02); *G01K 2207/02* (2013.01)

(58) Field of Classification Search
CPC ..... G01K 1/024; G01K 2207/02; H04W 4/38; H04W 4/80
See application file for complete search history.

(56) References Cited

U.S. PATENT DOCUMENTS

| 11,709,102 B1 * | 7/2023 | Ai | G01K 1/026 |
| | | | 702/130 |
| 2014/0256261 A1 * | 9/2014 | Barrus | H04B 7/24 |
| | | | 455/41.2 |
| 2015/0120000 A1 * | 4/2015 | Coffey | H04W 12/50 |
| | | | 315/86 |
| 2016/0037956 A1 * | 2/2016 | Wu | A47J 27/10 |
| | | | 99/403 |
| 2020/0129006 A1 * | 4/2020 | Nivala | A47J 36/321 |
| 2022/0381621 A1 * | 12/2022 | Huang | G01K 1/024 |

FOREIGN PATENT DOCUMENTS

| CN | 213021979 U | 4/2021 |
| CN | 213874723 U | 8/2021 |
| CN | 216899319 | 7/2022 |
| KR | 101132737 B1 * | 4/2012 |

* cited by examiner

*Primary Examiner* — Brandi N Hopkins
*Assistant Examiner* — Janice M Soto
(74) *Attorney, Agent, or Firm* — Addison D. Ault; Richard P. Moerschell; IPGentleman Intellectual Property Services, LLC

(57) ABSTRACT

The present application discloses a food temperature measurement system. The food temperature measurement system includes a food temperature measurement probe, wherein the food temperature measurement probe is internally provided with a first wireless transmission module; and a host machine, wherein the host machine is internally provided with a second wireless transmission module and a third wireless transmission module; and the first wireless transmission module and the second wireless transmission module are configured to implement data transmission between the host machine and the food temperature measurement probe, the third wireless transmission module is configured to implement data transmission between the host machine and a terminal device, the working frequency of the first wireless transmission module is the same as that of the second wireless transmission module, and the working frequency of the third wireless transmission module is different from that of the second wireless transmission module.

7 Claims, 10 Drawing Sheets

FOOD TEMPERATURE MEASUREMENT SYSTEM

CROSS-REFERENCE TO RELATED APPLICATIONS

The application claims priority to Chinese patent application No. 202321280428.7, filed on May 24, 2023, the entire contents of which are incorporated herein by reference.

TECHNICAL FIELD

The present invention relates to the technical field of data transmission, and particularly relates to a food temperature measurement system.

BACKGROUND

An existing food temperature measurement system only uses one wireless communication mode to transmit food temperature data, which cannot satisfy the requirements of users on data reading speed and data reading accuracy. For example, food temperature data is transmitted by using a Bluetooth module or a 433 wireless module. However, owing to the limitation of using the Bluetooth module or the 433 wireless module, data acquisition of food temperature by using the Bluetooth module is susceptible to interference by other signals, resulting in a data reading deviation. When the 433 wireless module is used for data acquisition of food temperature, the time to read food temperature information by the users is long.

SUMMARY

Therefore, the present invention aims to overcome the problem of unstable data transmission by a wireless transmission module in a food temperature measurement system in the prior art.

In a first aspect, the present application provides a food temperature measurement system, including:
  a food temperature measurement probe, wherein the food temperature measurement probe is internally provided with a first wireless transmission module; and
  a host machine, wherein the host machine is internally provided with a second wireless transmission module and a third wireless transmission module; and
  the first wireless transmission module and the second wireless transmission module are configured to implement data transmission between the host machine and the food temperature measurement probe, the third wireless transmission module is configured to implement data transmission between the host machine and a terminal device, the working frequency of the first wireless transmission module is the same as that of the second wireless transmission module, and the working frequency of the third wireless transmission module is different from that of the second wireless transmission module.

Optionally, the first wireless transmission module includes a first radio frequency chip, a first radio frequency circuit and a first crystal oscillator circuit; a first control port of the first radio frequency chip is connected to the first radio frequency circuit; a second control port of the first radio frequency chip is connected to the first crystal oscillator circuit; the first radio frequency chip is configured to output data detected by the food temperature measurement probe to the host machine; the first radio frequency circuit is configured to filter out noise waves in the first wireless transmission module; and the first crystal oscillator circuit is configured to provide a clock signal to the first radio frequency chip.

Optionally, the host machine further includes:
  a control module, connected to the second wireless transmission module and the third wireless transmission module, respectively, and configured to receive data transmitted between the host machine and the food temperature measurement probe and to output the data to the third wireless transmission module;
  a display module, connected to the control module and configured to display the data transmitted between the host machine and the food temperature measurement probe according to controlling of the control module; and
  an alarm module, connected to the control module and configured to alarm according to the control module.

Optionally, the host machine further includes a power supply module, connected to the second wireless transmission module, the third wireless transmission module, the control module, the display module and the alarm module, respectively, and configured to supply power to the second wireless transmission module, the third wireless transmission module, the control module, the display module and the alarm module.

Optionally, the second wireless transmission module includes a second radio frequency chip, a second radio frequency circuit and a second crystal oscillator circuit; a first control port of the second radio frequency chip is connected to the second radio frequency circuit; a second control port of the second radio frequency chip is connected to the second crystal oscillator circuit; the second radio frequency chip is configured to output data detected by the food temperature measurement probe to the control circuit or to output control information to the food temperature measurement probe; the second radio frequency circuit is configured to filter out noise waves in the second wireless transmission module; and the second crystal oscillator circuit is configured to provide a clock signal to the second radio frequency chip.

Optionally, the third wireless transmission module includes a third radio frequency chip, a third radio frequency circuit and a third crystal oscillator circuit; a first control port of the third radio frequency chip is connected to the third radio frequency circuit; a second control port of the third radio frequency chip is connected to the third crystal oscillator circuit; the third radio frequency chip is configured to output data detected by the food temperature measurement probe to the terminal device; the third radio frequency circuit is configured to filter out noise waves in the third wireless transmission module; and the second crystal oscillator circuit is configured to provide a clock signal to the third radio frequency chip.

Optionally, the working frequency of the first wireless transmission module and the second wireless transmission module is 433 MHz.

Optionally, the working frequency of the third wireless transmission module is 2.4 GHz.

Optionally, the third wireless transmission module is a Bluetooth module.

Optionally, the Bluetooth module performs data transmission by using a serial communication protocol.

The technical solution of the present invention has the following advantages:

By arranging the first wireless transmission module in the food temperature measurement probe, arranging the second wireless transmission module and the third wireless transmission module in the host machine, and enabling the first wireless transmission module and the second wireless transmission module to transmit data transmitted by the food temperature measurement probe at the same working frequency, the data transmitted between the food temperature measurement probe and the host machine is ensured accurate and stable. The data transmitted by the food temperature measurement probe enters the third wireless transmission module. To make a terminal user be capable of rapidly reading the data transmitted by the food temperature measurement probe, the third wireless transmission module is needed to transmit the data transmitted by the food temperature measurement probe, so that the user is capable of accurately and rapidly reading the data transmitted between the food temperature measurement probe. Data transmission for the food temperature measurement probe is carried out by using the first wireless transmission module, the second wireless transmission module and the third wireless transmission module, so that fast and stable data transmission of the food temperature measurement system is implemented.

BRIEF DESCRIPTION OF DRAWINGS

To illustrate the technical solutions in the specific implementation modes of the present invention or in the prior art more clearly, a brief introduction to the drawings required for the description of the specific implementation modes or the prior art will be provided below. Apparently, the drawings in the following description are some of the implementation modes of the present invention, and those of ordinary skill in the art may still derive other drawings from these drawings without making creative efforts.

DESCRIPTION OF NUMERALS IN DRAWINGS

Figure 1:
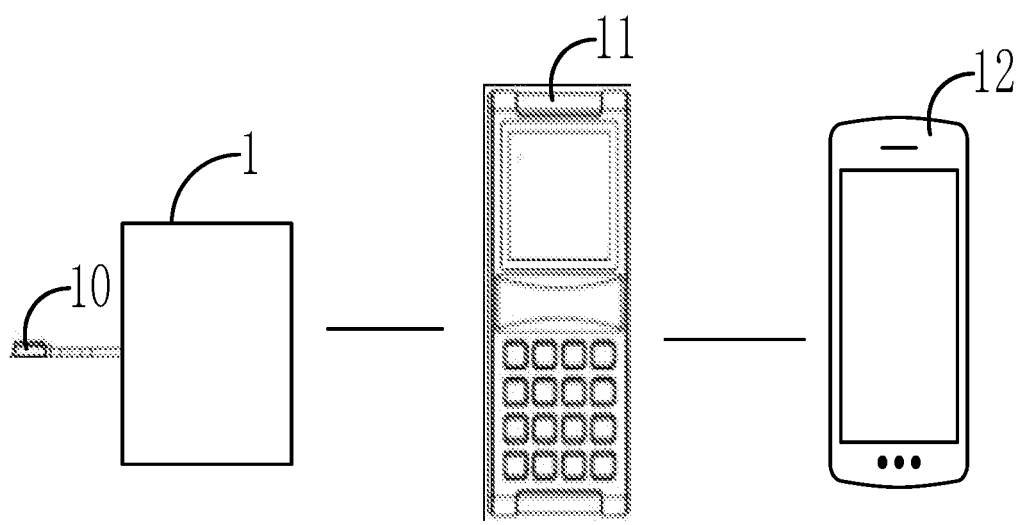
FIG. 1 is a schematic diagram of an application scenario of a food temperature measurement system provided by the embodiment of the present application.

Food temperature measurement probe—10; host machine—11; terminal device—12; first wireless transmission module—101; second wireless transmission module—111; third wireless transmission module—112; control module—113; display module—114; alarm module—115; power supply module—116; first radio frequency chip—101a; first radio frequency circuit—101b; first crystal oscillator circuit—101c; second radio frequency chip—111a; second radio frequency circuit—111b; second crystal oscillator circuit—111c; third radio frequency chip—121a; third radio frequency circuit—121b; third crystal oscillator circuit—121c; first inductor—L1; second inductor—L2; third inductor—L3; fourth inductor—L4; fifth inductor—L5; sixth inductor—L6; seventh inductor—L7; eighth inductor—L8; first capacitor—C1; second capacitor—C2; third capacitor—C3; fourth capacitor—C4; fifth capacitor—C5; sixth capacitor—C6; seventh capacitor—C7; eighth capacitor—C8; ninth capacitor—C9; tenth capacitor—C10; eleventh capacitor—C11; twelfth capacitor—C12; thirteenth capacitor—C13; fourteenth capacitor—C14; fifteenth capacitor—C15; first resistor—R1; antenna—ANT.

DETAILED DESCRIPTION OF THE EMBODIMENTS

The technical solution of the present invention will be clearly and intactly described below. Apparently, the embodiments described are merely a part of embodiments of the present invention rather than all of the embodiments. On a basis of the embodiments in the present invention, all other embodiments obtained by those skilled in the technical field without creative efforts fall into the scope of protection of the present invention.

In the description of the present invention, it is to be noted that orientation or position relations indicated by the terms "central", "upper", "lower", "left", "right", "vertical", "horizontal", "inner", "outer", etc. are based on orientation or position relations shown in the accompanying drawings, and are merely for facilitating the description of the present invention and simplifying the description, rather than indicating or implying the device or element referred to must have a specific orientation or be constructed and operated in a specific orientation, and therefore will not be interpreted as limiting the present invention. In addition, the terms "first", "second" and "third" are for descriptive purposes only and should not be construed as indicating or implying relative importance.

In the description of the present invention, it should be noted that, unless otherwise explicitly specified and defined, the terms "mounting", "connecting" and "connection" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. Those of ordinary skill in the art can understand specific meaning of the terms in the present invention under specific circumstances.

Further, the technical features involved in different implementations of the present invention described below may be combined with one another as long as they do not constitute a conflict with one another.

As shown in FIG. 1, an application scenario of a food temperature measurement system provided by the present application is shown. In the application scenario, the food temperature measurement system includes a food to be measured 1, a food temperature measurement probe 10, a host machine 11 and a terminal 12. The food temperature measurement probe 10 is placed in the food to be measured 1 and is configured to detect temperature information of the food to be measured 1; the host machine is configured to receiver data sent by the food temperature measurement probe 10 and the terminal 12 and to process the received data; the terminal 12 can be an electronic device such as a mobile phone and a PC with an information transmitting and receiving function, the terminal 12 is configured to receive data sent by the host machine 11, and the terminal 12 further can send a control instruction to the host machine 11, so that the host machine 11 controls the food temperature measurement probe 10 to send the detected data (for example, electrical quantity data of the probe). The terminal 12 can further control the content displayed by the host machine 11.

A working process of the food temperature measurement system is as follows: when it is needed to measure the food temperature (i.e., the food temperature measurement probe 10 is inserted into the food to be measured 1), after the host machine 11 receives a control signal sent by the terminal 12 or a user and sends an execution signal to the food temperature measurement probe 10, the food temperature measurement probe 10 starts to measure the food to be measured 1. When the food temperature measurement probe 10 completes measurement of food temperature, the food temperature measurement probe 10 can package the temperature data after measurement, the temperature data is sent by a wireless data transmission module arranged in the food temperature measurement probe 10, and then the wireless data transmission module in the host machine 11 receives the temperature data. The host machine 11 can display the received temperature data according to a usage requirement or forwards the temperature data to the terminal 12 through the wireless data transmission module for display.

It should be noted that besides acquiring the temperature data, the food temperature measurement probe 10 can further acquire electrical quantity information of the probe itself. When it is needed to display the electrical quantity of the food temperature measurement probe 10 or the temperature information measured by the food temperature measurement probe 10 on the terminal 12 or the host machine 11, the terminal 12 or the host machine 11 receives related data from the food temperature measurement probe 10 and displays the same.

Figure 2:
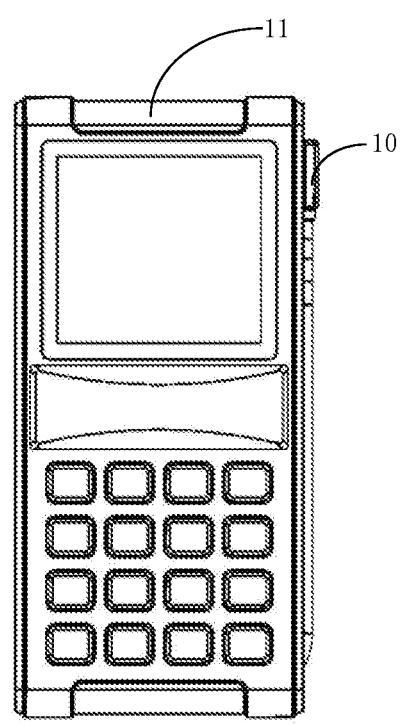
FIG. 2 is a structural schematic diagram of a host machine and a probe in the food temperature measurement system provided by the embodiment of the present application.

FIG. 2 is a structural schematic diagram of the food temperature measurement probe 10 and the host machine 11 in the food temperature measurement system provided by the present application. When the food temperature measurement probe 10 is not used, it can be stored in the host machine 11, i.e., both sides of the host machine 11 are provided with grooves for accommodating the food temperature measurement probe 10, so that the user use and carry the food temperature measurement probe conveniently. The host machine 11 can be internally provided with a display screen and a plurality of keys. The user can display the data detected by the probe 10 through the display screen. The control instruction is sent to the host machine 11 through the keys. For example, the user controls the host machine 11 to send a temperature detection instruction to the probe 10 through the keys. For another example, the user controls the host machine 11 to display the received detection data through the keys.

Figure 3:
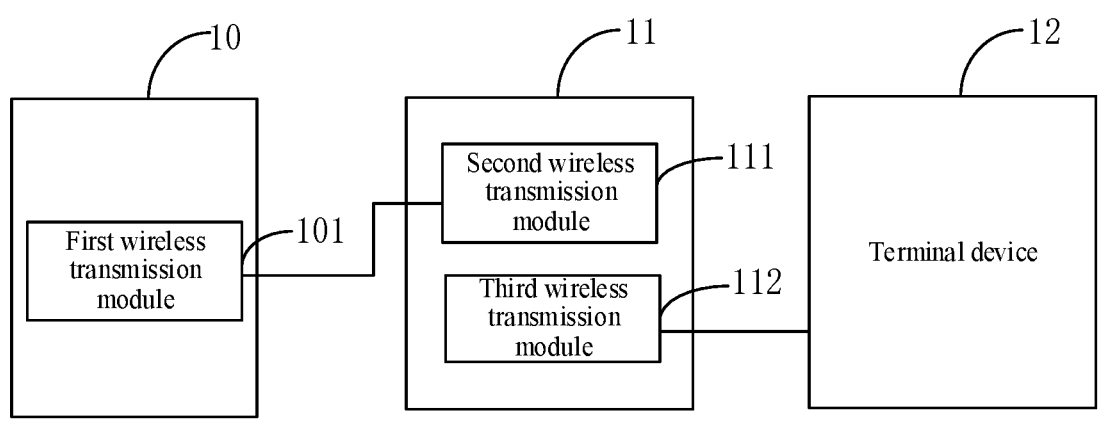
FIG. 3 is a schematic structure diagram of the food temperature measurement system provided by the embodiment of the present application.

To rapidly and accurately acquire the data acquired by the food temperature measurement probe 10. As shown in FIG. 3, the food temperature measurement system provided by the present application is configured to acquire the food temperature. The food temperature measurement system includes the food temperature measurement probe 10 and the host machine 11. The food temperature measurement probe 10 is internally provided with a first wireless transmission module 101, and the host machine 11 is internally provided with a second wireless transmission module 111 and a third wireless transmission module 112.

The first wireless transmission module 101 and the second wireless transmission module 111 are configured to implement data transmission between the host machine 11 and the food temperature measurement probe 10, the third wireless transmission module 112 is configured to implement data transmission between the host machine 11 and the terminal device 12, the working frequency of the first wireless transmission module 101 is the same as that of the second wireless transmission module 111, and the working frequency of the third wireless transmission module 112 is different from that of the second wireless transmission module 111.

In the embodiment, the data transmitted between the host machine 11 and the food temperature measurement probe 10 can be detected food temperature data, electrical quantity data of the food measurement probe and so forth.

The first wireless transmission module 101 and the second wireless transmission module 111 can be 433M wireless modules, and the third wireless transmission module 112 can be a Bluetooth wireless module or a 2.4G wireless module. The Bluetooth module performs data transmission by using a serial communication protocol.

The working frequency of the first wireless transmission module 101 and the second wireless transmission module 111 is 433 MHz, and the working frequency of the third wireless transmission module 112 is 2.4 GHz.

The terminal 12 device can be an electronic device such as a mobile phone or a computer or a tablet personal computer.

For example, after the food temperature measurement probe 10 detects the food temperature data or the electrical quantity data of the probe, the first wireless transmission module 101 in the food temperature measurement probe 10 sends the food temperature data or the electrical quantity data of the probe to the second wireless transmission module 111 in the host machine 11. After receiving the food temperature data or the electrical quantity data of the probe, the host machine 11 can display the food temperature data or the electrical quantity data of the probe, and/or send the received food temperature data or the electrical quantity data of the probe to the terminal 12 through the third wireless transmission module 112 arranged in the host machine 11. After receiving the food temperature data or the electrical quantity data of the probe, the terminal 12 displays or stores the food temperature data or the electrical quantity data of the probe or waits for the user to send other control instructions.

For another example, when the terminal 12 is the mobile phone, the host machine 11 and the mobile phone are in a connected and paired state, operations are set by the host machine 11 and in any state, the host machine 11 will transmit and synchronize corresponding instructions to a mobile phone APP through the third wireless transmission module 112. For example, food is beef as the host machine 11 sets, the host machine alarms when the beef reaches 75° C., and meanwhile, the mobile phone APP will be synchronized to alarm when the beef reaches 75° C.

When the host machine 11 and the mobile phone APP are in the connected and paired state, the user can set any setting state of the mobile phone APP, which will be synchronized to the host machine 11 through the third wireless transmission module 112.

According to the food temperature measurement system provided by the embodiment of the present application, by arranging the first wireless transmission module 101 in the food temperature measurement probe 10, arranging the second wireless transmission module 111 and the third wireless transmission module 112 in the host machine 11, and enabling the first wireless transmission module 101 and the second wireless transmission module 111 to transmit data transmitted by the food temperature measurement probe 10 at the same working frequency, the data transmitted between the food temperature measurement probe 10 and the host machine 11 is ensured accurate and stable. The data transmitted by the food temperature measurement probe 10 enters the third wireless transmission module 112. To make a terminal 12 user be capable of rapidly reading the data transmitted by the food temperature measurement probe 10, the third wireless transmission module 112 is needed to transmit the data transmitted by the food temperature measurement probe 10, so that the user is capable of accurately and rapidly reading the data transmitted between the food temperature measurement probe 10. Data transmission for the food temperature measurement probe 10 is carried out by using the first wireless transmission module 101, the second wireless transmission module 111 and the third wireless transmission module 112, so that fast and stable data transmission of the food temperature measurement system is implemented.

Figure 4:
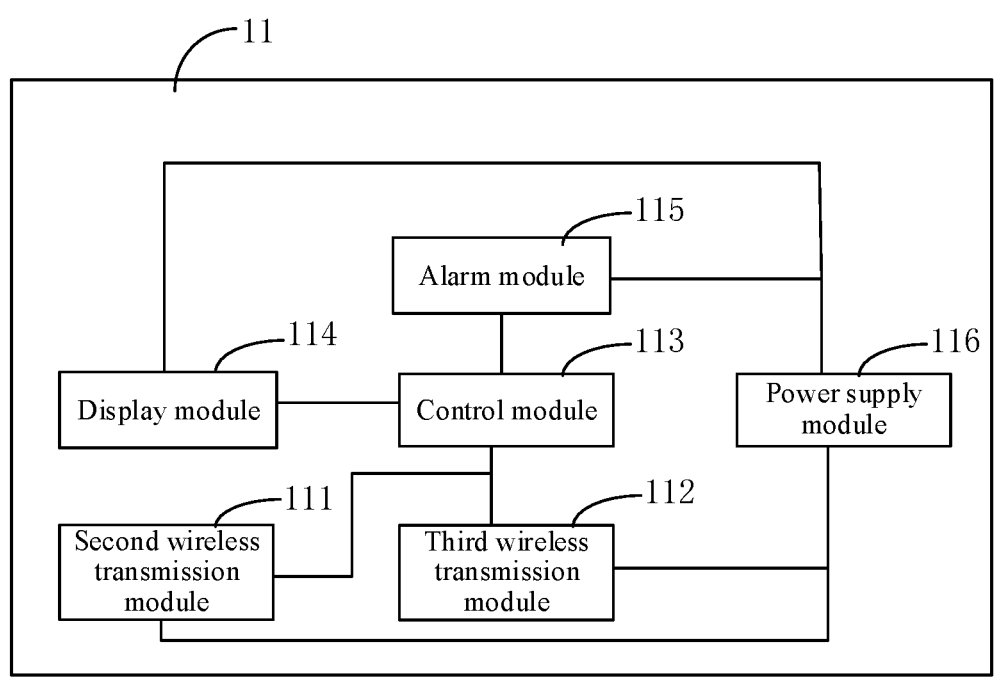
FIG. 4 is a schematic structure diagram of another food temperature measurement system provided by the embodiment of the present application.

As shown in FIG. 4, besides the second wireless transmission module 111 and the third wireless transmission module 112 arranged in the host machine 11, the food temperature measurement system provided by the present application further includes:

- a control module 113, connected to the second wireless transmission module 111 and the third wireless transmission module 112, respectively, and configured to receive data transmitted between the host machine 11 and the food temperature measurement probe 10 and to output the data to the third wireless transmission module 112;
- a display module 114, connected to the control module 113 and configured to display the data transmitted between the host machine 11 and the food temperature measurement probe 10 according to controlling of the control module 113;
- an alarm module 115, connected to the control module 113 and configured to alarm according to the control module 113; and
- a power supply module 116, connected to the second wireless transmission module 111, the third wireless transmission module 112, the control module 113, the display module 114 and the alarm module 115, respectively, and configured to supply power to the second wireless transmission module 111, the third wireless transmission module 112, the control module 113, the display module 114 and the alarm module 115.

Figure 5:
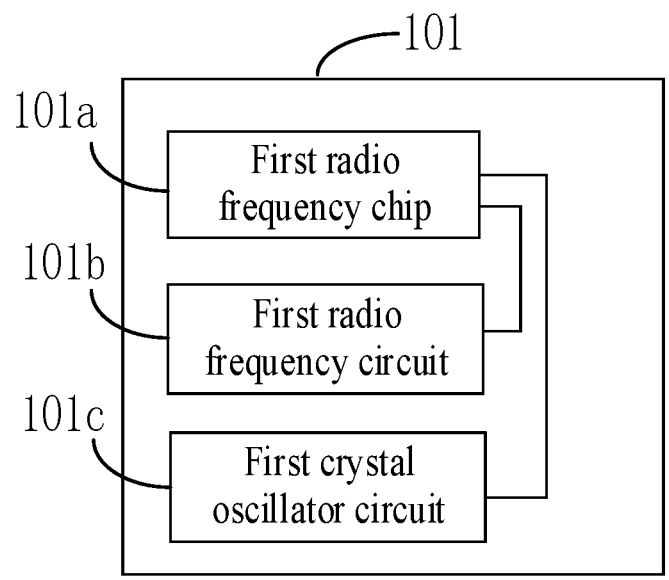
FIG. 5 is a structural schematic diagram of a first wireless transmission module in the food temperature measurement system provided by the embodiment of the present application.

As shown in FIG. 5, the first wireless transmission module 101 in the food temperature measurement system provided by the present application includes: a first radio frequency chip 101*a*, a first radio frequency circuit 101*c* and a first crystal oscillator circuit 101*b*.

A first control port of the first radio frequency chip 101*a* is connected to the first radio frequency circuit 101*c*; a second control port of the first radio frequency chip 101*a* is connected to the first crystal oscillator circuit 101*b*; the first radio frequency chip 101*a* is configured to output data detected by the food temperature measurement probe to the host machine; the first radio frequency circuit 101*c* is configured to filter out noise waves in the first wireless transmission module 101; and the first crystal oscillator circuit 101*b* is configured to provide a clock signal to the first radio frequency chip 101*a*.

Figure 6:
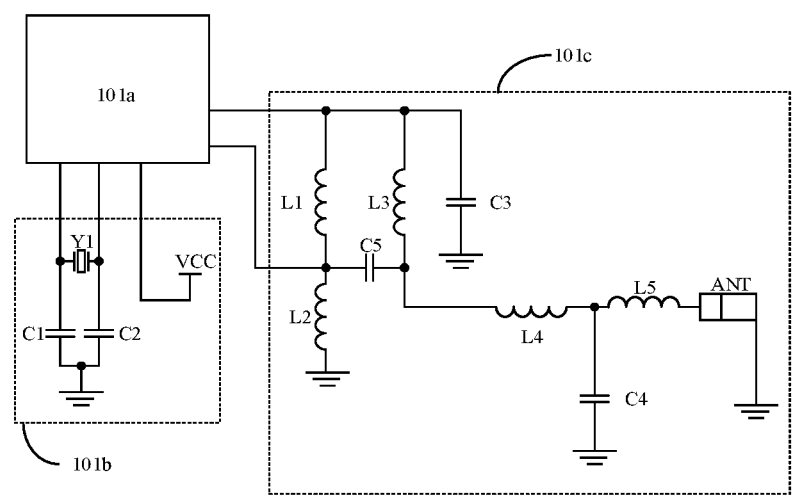
FIG. 6 is a structural schematic diagram of a circuit of the first wireless transmission module in the food temperature measurement system provided by the embodiment of the present application.

FIG. 6 is a connecting schematic diagram of a circuit of the first wireless transmission module 101 in the food temperature measurement system provided by the present application. The first crystal oscillator circuit 101*b* includes a first crystal oscillator Y1, a first capacitor C1 and a second capacitor C2. A first end of the first crystal oscillator Y1 is connected to a first sub port in the second control port of the first radio frequency chip 101*a* and a first end of the first capacitor C1, respectively, a second end of the first crystal oscillator Y1 is connected to a second sub port in the second control port of the first radio frequency chip 101*a* and a first end of the second capacitor C2, respectively, and the second ends of the first capacitor C1 and the second capacitor C2 both are grounded. To arrange the first crystal oscillator Y1 circuit 101*b* in the first wireless transmission module 101 is to provide the clock signal for normal work of the first radio frequency chip 101*a*, so as to guarantee normal work of data transmission of the first wireless transmission module 101, i.e., the food temperature measurement probe.

The first radio frequency circuit 101*c* includes a first inductor L1, a second inductor L2, a third inductor L3, a fourth inductor L4, a fifth inductor L5, a third capacitor C3, a fourth capacitor C4, a fifth capacitor C5 and an antenna ANT. A first end of the first inductor L1 is connected to a first sub port in the first control port of the first radio frequency chip 101*a*, a first end of the third inductor L3 and a first end of the third inductor C3, respectively; a second end of the first inductor L1 is connected to a second sub port in the first control port of the first radio frequency chip 101*a*, a first end of the second capacitor L2 and a first end of the fifth capacitor C5, respectively; a second end of the second inductor L2 is grounded; a second end of the fifth capacitor C5 is connected to a second end of the third inductor L3 and a first end of the fourth inductor L4, respectively; a second end of the third capacitor C3 is grounded; a second end of the fourth inductor L4 is connected to a first end of the fifth inductor L5 and a first end of the fourth capacitor C4, respectively; a second end of the fourth capacitor C4 is grounded; a second end of the fifth inductor L5 is connected to the antenna ANT; the first radio frequency circuit 101*c* is configured to send the data acquired by the food temperature measurement probe or receive an acquisition or control instrument sent by the host machine; the capacitors and inductors in the first radio frequency circuit 101*c* are configured to guarantee normal work of the circuit, so as to reduce interference signals of the circuit.

Optionally, the first wireless transmission module 101 can further be integrated with a temperature acquisition function, i.e., the first wireless transmission module 101 not only can acquire the food temperature by the food temperature measurement probe, but also can forward the acquired temperature data to the host machine or the terminal device for display.

Figure 7:
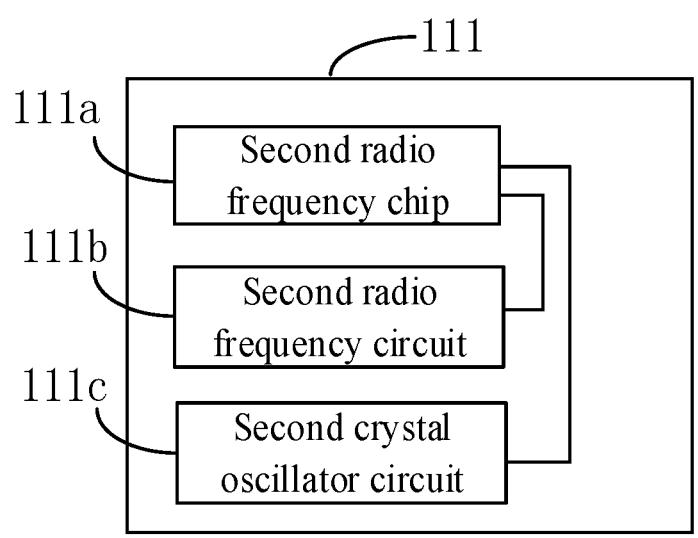
FIG. 7 is a structural schematic diagram of a second wireless transmission module in the food temperature measurement system provided by the embodiment of the present application.

As shown in FIG. 7, the second wireless transmission module 111 in the food temperature measurement system provided by the present application includes: a second radio frequency chip 111a, a second radio frequency circuit 111c and a second crystal oscillator circuit 111b.

A first control port of the second radio frequency chip 111a is connected to the second radio frequency circuit 111c; a second control port of the second radio frequency chip 111a is connected to the second crystal oscillator circuit 111b; the second radio frequency chip 111a is configured to output data detected by the food temperature measurement probe to a control circuit or to output control information to the food temperature measurement probe; the second radio frequency circuit 111c is configured to filter out noise waves in the second wireless transmission module 111; and the second crystal oscillator circuit 112b is configured to provide a clock signal to the second radio frequency chip 111a.

Figure 8:
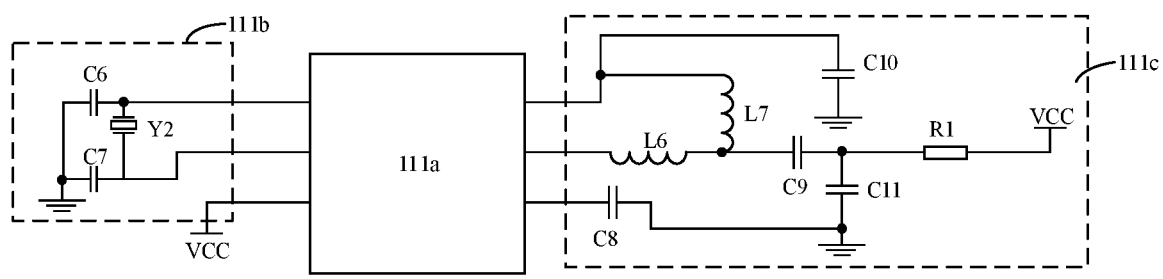
FIG. 8 is a structural schematic diagram of a circuit of the second wireless transmission module in the food temperature measurement system provided by the embodiment of the present application.

FIG. 8 is a connecting schematic diagram of a circuit of the second wireless transmission module 111 in the food temperature measurement system provided by the present application. The second crystal oscillator circuit 111b includes a second crystal oscillator Y2, a sixth capacitor C6 and a seventh capacitor C7. A first end of the second crystal oscillator Y2 is connected to a first sub port in the second control port of the second radio frequency chip 111a and a first end of the sixth capacitor C6, respectively, a second end of the second crystal oscillator Y2 is connected to a second sub port in the second control port of the second radio frequency chip 111a and a first end of the seventh capacitor C7, respectively, and the second ends of the sixth capacitor C6 and the seventh capacitor C7 both are grounded. To arrange the second crystal oscillator circuit 111b in the second wireless transmission module 111 is to provide the clock signal for normal work of the second radio frequency chip 111a, so as to guarantee normal work of data transmission between the second wireless transmission module 111, i.e., the food temperature measurement probe and the host machine.

The second radio frequency circuit 111c includes a sixth inductor L6, a seventh inductor L7, an eighth inductor L8, a ninth capacitor C9, a tenth capacitor C10, an eleventh capacitor C11 and a first resistor R1. A first end of the sixth inductor L6 is connected to a first sub port in the first control port of the second radio frequency chip 111a and a first end of the tenth capacitor C10, respectively; a second end of the tenth capacitor C10 is grounded; a first end of the seventh inductor L7 is connected to a second sub port in the first control port of the second radio frequency chip 111a; a second end of the seventh inductor L7 is connected to a second end of the sixth inductor L6 and a first end of the ninth capacitor C9, respectively; a second end of the ninth capacitor C9 is connected to a first end of the eleventh capacitor C11 and a first end of the first resistor R1, respectively; a first end of the eighth capacitor C8 is connected to a third sub port in the first control port of the second radio frequency chip 111a; and a second end of the eighth capacitor C8 and a second end of the eleventh capacitor C11 both are grounded. The second radio frequency circuit 111c in the second wireless transmission module 111 is configured to receive the data acquired by the food temperature measurement probe, and to transmit the acquired data to the control module in the host machine or to send an acquisition or control instruction to the food temperature measurement probe according to a user instruction. The capacitors, inductors and resistors arranged in the second radio frequency circuit 111c are configured to guarantee normal work of the circuit, so as to reduce interference signals of the circuit.

Figure 9:
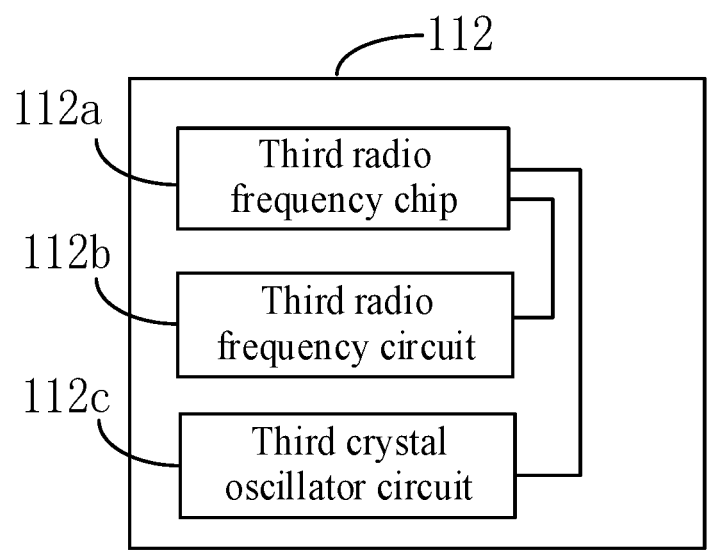
FIG. 9 is a structural schematic diagram of a third wireless transmission module in the food temperature measurement system provided by the embodiment of the present application.

As shown in FIG. 9, the third wireless transmission module 112 in the food temperature measurement system provided by the present application includes: a third radio frequency chip 112a, a third radio frequency circuit 112c and a third crystal oscillator circuit 112b.

A first control port of the third radio frequency chip 112a is connected to the third radio frequency circuit 112c; a second control port of the third radio frequency chip 112a is connected to the third crystal oscillator circuit 112b; the third radio frequency chip 112a is configured to output data detected by the food temperature measurement probe to the terminal device; the third radio frequency circuit 112c is configured to filter out noise waves in the third wireless transmission module 112; and the third crystal oscillator circuit 112b is configured to provide a clock signal to the third radio frequency chip 112a.

Figure 10:
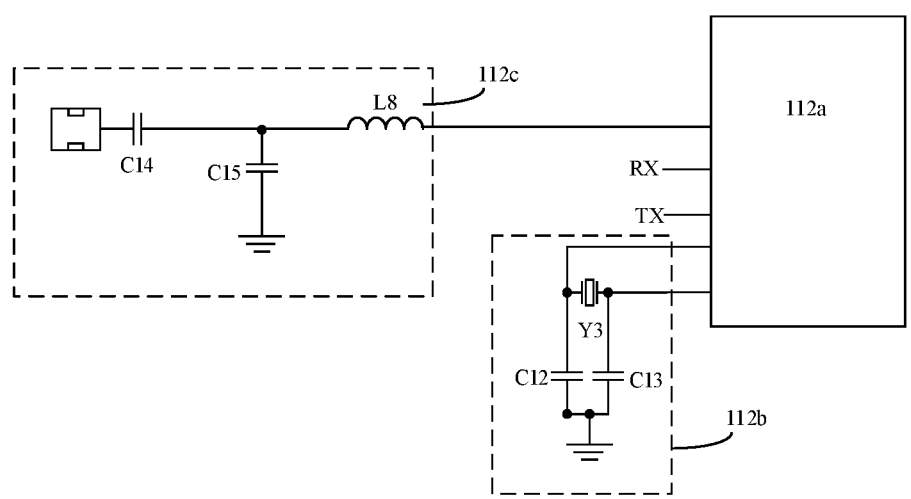
FIG. 10 is a structural schematic diagram of a circuit of the third wireless transmission module in the food temperature measurement system provided by the embodiment of the present application.

FIG. 10 is a connecting schematic diagram of a circuit of the third wireless transmission module 112 in the food temperature measurement system provided by the present application. The third crystal oscillator circuit 112b includes a third crystal oscillator Y3, a twelfth capacitor C12 and a thirteenth capacitor C13. A first end of the third crystal oscillator Y3 is connected to a first sub port in the second control port of the third radio frequency chip 112a and a first end of the twelfth capacitor C12, respectively, a second end of the third crystal oscillator Y3 is connected to a second sub port in the second control port of the third radio frequency chip 112a and a first end of the thirteenth capacitor C13, respectively, and the second ends of the twelfth capacitor C12 and the thirteenth capacitor C13 both are grounded. To arrange the third crystal oscillator circuit 112b in the third wireless transmission module 112 is to provide the clock signal for normal work of the third radio frequency chip 112a, so as to guarantee normal work of data transmission between the third wireless transmission module 112, i.e., the food temperature measurement probe and the host machine and that between the host machine and the terminal.

The third radio frequency circuit 112c includes an eighth inductor L8, a fourteenth capacitor C14 and a fifteenth capacitor C15. A first end of the eighth inductor L8 is connected to a first sub port in the first control port of the third radio frequency chip 112a; a second end of the eighth inductor L8 is connected to a first end of the fourteenth capacitor C14 and a first end of the fifteenth capacitor C15, respectively; a second end of the fourteenth capacitor C14 is connected to a control end of the control module; and a second end of the fifteenth capacitor C15 is grounded. The third radio frequency circuit 112c is configured to send the data acquired by the food temperature measurement probe or to control the host machine to send an acquisition or control instruction to the food temperature measurement probe according to an instruction sent by the terminal. The capacitors and inductors arranged in the third radio frequency circuit 112c are configured to guarantee normal work of the circuit, so as to reduce interference signals of the circuit. It should be noted that the third radio frequency chip 112a is further provided with a TX interface and an RX interface, configured to implement communication transmission between the host machine and the terminal device. In the third wireless transmission module 112, by arranging the TX interface, the RX interface and the third radio frequency circuit 112, data transmission is implemented according to characteristics of different frequency bands, so that efficient and accurate data transmission is guaranteed.

Apparently, the abovementioned embodiments are merely examples made for describing the utility model clearly and are not to limit the implementation modes. For those of ordinary skill in the art, modifications or variations in other forms may make on the basis of the above description. It is unnecessary to and unable to list all the implementation modes herein. Obvious changes or modifications derived therefrom are still within the scope of protection of the present disclosure.

What is claimed is:

1. A food temperature measurement system, comprising:
a food temperature measurement probe, wherein the food temperature measurement probe is internally provided with a first wireless transmission module; and
a host machine, wherein the host machine is internally provided with a second wireless transmission module and a third wireless transmission module; and
the first wireless transmission module and the second wireless transmission module are configured to implement data transmission between the host machine and the food temperature measurement probe, the third wireless transmission module is configured to implement data transmission between the host machine and a terminal device, the working frequency of the first wireless transmission module is the same as that of the second wireless transmission module, and the working frequency of the third wireless transmission module is different from that of the second wireless transmission module;
wherein the working frequency of the first wireless transmission module and the second wireless transmission module is 433 MHz, and
wherein the working frequency of the third wireless transmission module is 2.4 GHz;
wherein the first wireless transmission module comprises a first radio frequency chip, a first radio frequency circuit and a first crystal oscillator circuit;
wherein a first control port of the first radio frequency chip is connected to the first radio frequency circuit; a second control port of the first radio frequency chip is connected to the first crystal oscillator circuit; the first radio frequency chip is configured to output data detected by the food temperature measurement probe to the host machine; the first radio frequency circuit is configured to filter out noise waves in the first wireless transmission module; and the first crystal oscillator circuit is configured to provide a clock signal to the first radio frequency chip;
wherein the first crystal oscillator circuit includes a first crystal oscillator Y1, a first capacitor C1 and a second capacitor C2; a first end of the first crystal oscillator Y1 is connected to a first sub port in the second control port of the first radio frequency chip and a first end of the first capacitor C1, respectively, a second end of the first crystal oscillator Y1 is connected to a second sub port in the second control port of the first radio frequency chip and a first end of the second capacitor C2, respectively, and the second ends of the first capacitor C1 and the second capacitor C2 both are grounded;
wherein the first radio frequency circuit includes a first inductor L1, a second inductor L2, a third inductor L3, a fourth inductor L4, a fifth inductor L5, a third capacitor C3, a fourth capacitor C4, a fifth capacitor C5 and an antenna ANT; wherein a first end of the first inductor L1 is connected to a first sub port in the first control port of the first radio frequency chip 101a, a first end of the third inductor L3 and a first end of the third capacitor C3, respectively; a second end of the first inductor L1 is connected to a second sub port in the first control port of the first radio frequency chip 101a, a first end of the second inductor L2 and a first end of the fifth capacitor C5, respectively; a second end of the second inductor L2 is grounded; a second end of the fifth capacitor C5 is connected to a second end of the third inductor L3 and a first end of the fourth inductor L4, respectively; a second end of the third capacitor C3 is grounded; a second end of the fourth inductor L4 is connected to a first end of the fifth inductor L5 and a first end of the fourth capacitor C4, respectively; a second end of the fourth capacitor C4 is grounded; and a second end of the fifth inductor L5 is connected to the antenna ANT;
wherein the first crystal oscillator circuit provides the clock signal for the first radio frequency chip, so as to provide reliable data transmission by the first wireless transmission module.

2. The food temperature measurement system according to claim 1, wherein the host machine further comprises:
a control module, connected to the second wireless transmission module and the third wireless transmission module, respectively, and configured to receive data transmitted between the host machine and the food temperature measurement probe and to output the data to the third wireless transmission module;
a display module, connected to the control module and configured to display the data transmitted between the host machine and the food temperature measurement probe according to controlling of the control module; and
an alarm module, connected to the control module and configured to alarm according to the control module.

3. The food temperature measurement system according to claim 2, wherein the host machine further comprises a power supply module, connected to the second wireless transmission module, the third wireless transmission module, the control module, the display module and the alarm module, respectively, and configured to supply power to the second wireless transmission module, the third wireless transmission module, the control module, the display module and the alarm module.

4. The food temperature measurement system according to claim 1, wherein the second wireless transmission module comprises a second radio frequency chip, a second radio frequency circuit and a second crystal oscillator circuit; a first control port of the second radio frequency chip is connected to the second radio frequency circuit; a second control port of the second radio frequency chip is connected to the second crystal oscillator circuit; the second radio frequency chip is configured to output data detected by the food temperature measurement probe to a control circuit or to output control information to the food temperature measurement probe; the second radio frequency circuit is configured to filter out noise waves in the second wireless transmission module; and the second crystal oscillator circuit is configured to provide a clock signal to the second radio frequency chip.

5. The food temperature measurement system according to claim 1, wherein the third wireless transmission module comprises a third radio frequency chip, a third radio frequency circuit and a third crystal oscillator circuit; a first control port of the third radio frequency chip is connected to the third radio frequency circuit; a second control port of the third radio frequency chip is connected to the third crystal oscillator circuit; the third radio frequency chip is configured to output data detected by the food temperature measurement probe to the terminal device; the third radio frequency circuit is configured to filter out noise waves in the third wireless transmission module; and the third crystal oscillator circuit is configured to provide a clock signal to the third radio frequency chip.

6. The food temperature measurement system according to claim 1, wherein the third wireless transmission module is a Bluetooth module.

7. The food temperature measurement system according to claim 6, wherein the Bluetooth module performs data transmission by using a serial communication protocol.

* * * * *